United States Patent
Guey et al.

(10) Patent No.: US 6,820,191 B2
(45) Date of Patent: Nov. 16, 2004

(54) APPARATUS AND METHOD FOR EXECUTING AN INSTRUCTION WITH A REGISTER BIT MASK FOR TRANSFERRING DATA BETWEEN A PLURALITY OF REGISTERS AND MEMORY INSIDE A PROCESSOR

(75) Inventors: Calvin Guey, Taipei Hsien (TW); Shyh-An Chi, Hsinchu (TW); Yu-Min Wang, Taichung (TW)

(73) Assignee: Faraday Technology Corp., Hsinchu (TW)

( * ) Notice: Subject to any disclaimer, the term of this patent is extended or adjusted under 35 U.S.C. 154(b) by 629 days.

(21) Appl. No.: 09/750,465

(22) Filed: Dec. 28, 2000

(65) Prior Publication Data

US 2002/0069350 A1 Jun. 6, 2002

(30) Foreign Application Priority Data

Dec. 5, 2000 (TW) ........................................ 89125862 A

(51) Int. Cl.$^7$ .......................... G06F 9/308; G06F 13/14; G06F 13/40
(52) U.S. Cl. ........................ 712/225; 712/211; 712/212; 712/300; 710/34
(58) Field of Search ................................. 712/225, 211, 712/212, 300, 228; 710/34; 708/210

(56) References Cited

U.S. PATENT DOCUMENTS

| | | | | |
|---|---|---|---|---|
| 3,634,658 A | * | 1/1972 | Brown ........................ | 377/33 |
| 4,348,741 A | * | 9/1982 | McAlister et al. .......... | 710/244 |
| 4,729,094 A | * | 3/1988 | Zolnowsky et al. .......... | 712/34 |
| 5,265,258 A | * | 11/1993 | Fiene et al. ................. | 711/158 |
| 5,561,816 A | * | 10/1996 | Mitsuhira et al. ............. | 710/22 |
| 5,796,970 A | * | 8/1998 | Higaki et al. ............... | 712/200 |

OTHER PUBLICATIONS

Motorola Inc., "MC68030 Enhanced 32–bit Microprocessor User's Manual", 1989, Prentice Hall, 2nd Ed. pp 3–120 to 3–122.*

* cited by examiner

Primary Examiner—Daniel H. Pan
(74) Attorney, Agent, or Firm—J.C. Patents

(57) ABSTRACT

An apparatus and method for executing an instruction with a register bit mask for transferring data between a plurality of registers and memory inside a processor is provided. The method includes adding the N bits in the N-bit decode information together to form an initial count value, and generating a plurality of register identification (ID) numbers equivalent in number to the initial count value. The register ID numbers correspond to the positions in the N-bit decode information that has a bit value '1'. According to the register ID number, a link is created between the plurality of registers corresponding to the register ID numbers and a memory unit so that the memory unit and the registers are free to exchange stored data.

7 Claims, 2 Drawing Sheets

APPARATUS AND METHOD FOR EXECUTING AN INSTRUCTION WITH A REGISTER BIT MASK FOR TRANSFERRING DATA BETWEEN A PLURALITY OF REGISTERS AND MEMORY INSIDE A PROCESSOR

CROSS-REFERENCE TO RELATED APPLICATION

This application claims the priority benefit of Taiwan application serial no. 89125862, filed Dec. 5, 2000.

BACKGROUND OF THE INVENTION

1. Field of Invention

The present invention relates to an apparatus and a method for executing processor instructions. More particularly, the present invention relates to an apparatus for executing a block data transfer instruction inside a processor.

2. Description of Related Art

Processor is an indispensable apparatus in many electronic products. For example, every computer must have at least one central processing unit and various controllers need to have one or more special function processors. As increasingly powerful electronic equipment is developed, the role played by processors is increasingly important.

To attain a higher level of performance, one obvious solution is to shorten the clock cycle or in other words, increase the operating frequency. Another way of increasing performance is to execute a multiple of instructions simultaneously in each clock cycle.

Among the list of instructions provided by a processor, there is one special purpose instruction for processing the data in a whole block of registers. For example, data can be read from or written into a whole block of registers with one instruction. Using a 16-register block as an example, to execute the instruction, a processor has to perform identical operations for each of the registers in the list, operations such as the transfer of data. This mode of operation is not wasteful when all 16 registers contain transferable data because the processor executing time is fully utilized. However, the number of registers that actually has to be dealt with is smaller than 16, or as low as 1, the rule of dealing with all 16 registers is quite wasteful and may lower processing efficiency. On the other hand, using the conventional technique, at least 16 program codes are necessary to implement the transferring operation, it means that a longer size of program codes is necessary. It will waste too many program codes to implement the instruction.

SUMMARY OF THE INVENTION

Accordingly, one object of the present invention is to provide an apparatus and method for executing block data transfer instruction inside a processor. The apparatus is capable of finding out the registers and their corresponding addresses that must be processed from the decode information of a register list. By processing the data in the specified registers only, program code as well as the processor executing cycles can be reduced. Hence, performance of the processor can be improved considerably.

To achieve these and other advantages and in accordance with the purpose of the invention, as embodied and broadly described herein, the invention provides an apparatus for executing block data transfer instruction inside a processor. The apparatus is able to receive a decode information having at least N bits. The apparatus includes an adder, a counter, a register identification number generator, a memory unit and a register list. The adder receives the N-bit decode information and then adds the bit values of the N-bit decode information together to obtain an initial count value. The counter receives the initial count value. The initial count value is decrement by one on each encounter. A count control signal is then issued by the counter. According to the count control signal, the register identification number generator produces a plurality of register identification numbers (IDs) that are equivalent in number to the initial count value. These register identification numbers correspond to the positions in the N-bit decode information that has a value of '1'. The memory unit is a place for holding data. The register list includes a plurality of registers. The register list receives the register identification (ID) numbers. According to the register identification numbers, data are free to transfer between the memory unit and a register corresponding to a register identification number.

The block data transfer apparatus further includes an address calculator. The address calculator generates an address signal according to the decode information. The address signal is sent to the memory unit. Data is transferred between the register that corresponds to a particular register ID number and the memory unit that corresponds to a particular address signal.

The register ID number generator of the block data transfer apparatus further includes N logic units for producing a number of register ID numbers equivalent to the initial count value. The counter subtracts one from the initial count value until the value zero is reached. The N logic units generate corresponding register ID numbers according to the positions in the N-bit decode information having a bit value of '1'.

This invention also provides a method of executing block data transfer instruction inside a processor after receiving an N-bit decode information. The method includes adding the N bits in the N-bit decode information together to form an initial count value, and generating a plurality of register identification (ID) numbers equivalent in number to the initial count value. The register ID numbers correspond to the positions in the N-bit decode information that has a bit value '1'. According to the register ID number, a link is created between the plurality of registers corresponding to the register ID numbers and a memory unit so that the memory unit and the registers are free to exchange stored data.

In the block data transfer method, the step for generating the register ID numbers further includes subtracting one from the initial count value after each encounter. The counting operation decrements the initial count value by one until a value zero is obtained. After each decrement operation, a register ID number is generated according to whether the position in the N-bit decode information has a bit value of '1' or not.

The block data transfer method further includes generating an address signal according to the decode information. Hence, data is free to exchange between a register corresponding to a particular register ID number and a memory location corresponding to the address signal.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
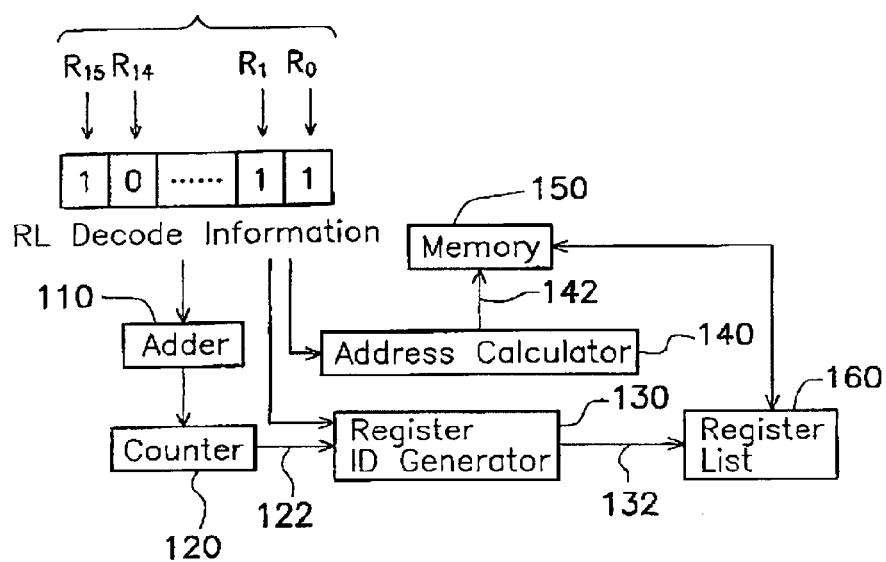
FIG. 1 is a block diagram showing an apparatus for executing block data transfer instruction inside a processor according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

This invention provides an apparatus for executing block data transfer instruction and corresponding method of operating the apparatus. The apparatus makes use of the decode information within a register list to find the number of registers and their corresponding addresses that must be processed. Ultimately, only data within specified registers are processed while the unspecified registers are skipped.

FIG. 1 is a block diagram showing an apparatus for executing block data transfer instruction inside a processor according to one preferred embodiment of this invention. In this embodiment, a register list (RL) capable of processing block data transfer for 16 registers is selected as an example. As shown in FIG. 1, decode information within the RL contains 16 bits altogether. Although the RL in FIG. 1 can only hold 16 bits for dealing with 16 registers, the actual number of bits and hence the number of registers that can be dealt with by this invention is unrestricted. In other words, the invention can be extended to cover data transfer involving 32 or 64 registers.

First, the RL decode information is transferred to an adder 110. Inside the adder 110, all the bits within the RL decode information are added together. In other word, the number of positions within the RL decode information having a value '1' is added to form a total value. The value is submitted to a counter 120 to serve as an initial count value. In fact, each bit number position with a '1' represents a register that must be processed. For example, a '1' in the first bit position starting from the right of the RL decode information indicates that the first register must be processed. In fact, the value submitted to the counter 120 is used to find out the number of registers in the instruction that need to be processed. In other words, the number of data transfers (total time required to complete the data transfer depends on the hit rate of the memory) between the memory and the registers can be estimated from the initial count value.

After each memory access and register storage operation, the counter 120 will decrement one from the initial count value. The instruction is complete when the counter 120 is decreased to zero. Hence, the counter 120 needs to process at most 16 times (the actual number of times is related to the number of registers that need to be process according to the decode information)., Before the counter 120 reaches zero, each operation generates a register identification (ID) number through a register ID number generator 130. At the same time, an address calculator 140 transfers the address of data to a memory unit 150. The memory unit 150 then transfers or receives data according to the address. The data are transferred to a register corresponding to the register in the register list specified by the register ID. Alternatively, data are read from a register corresponding to the address in the register list 160 as specified by the register ID. All this depends on whether data are read from the memory unit 150 or transferred into the memory unit 150. Hence, according the register ID produced by the register ID generator 130, data exchange between the registers within the register address list 160 and the memory unit 150 are free to initiate.

The aforementioned operation can be explained with the help of FIG. 1. For example, the counter 120 is an apparatus capable of performing a decrement operation. In each operation, the counter 120 issues count control signals via a cable 122 to control the register ID generator 130. According to the count control signal, the register ID generator 130 is able to produce register IDs. Hence, according to the computed address provided by the address calculator 140 and the register ID produced by the register ID generator 130, data inside a register amongst the registers in the register address list 160 that corresponds to a generated register ID number can be transferred to the memory unit 150 or data within a memory unit 150 corresponding to a computed address can be transferred to a register corresponding to the register ID.

Figure 2:
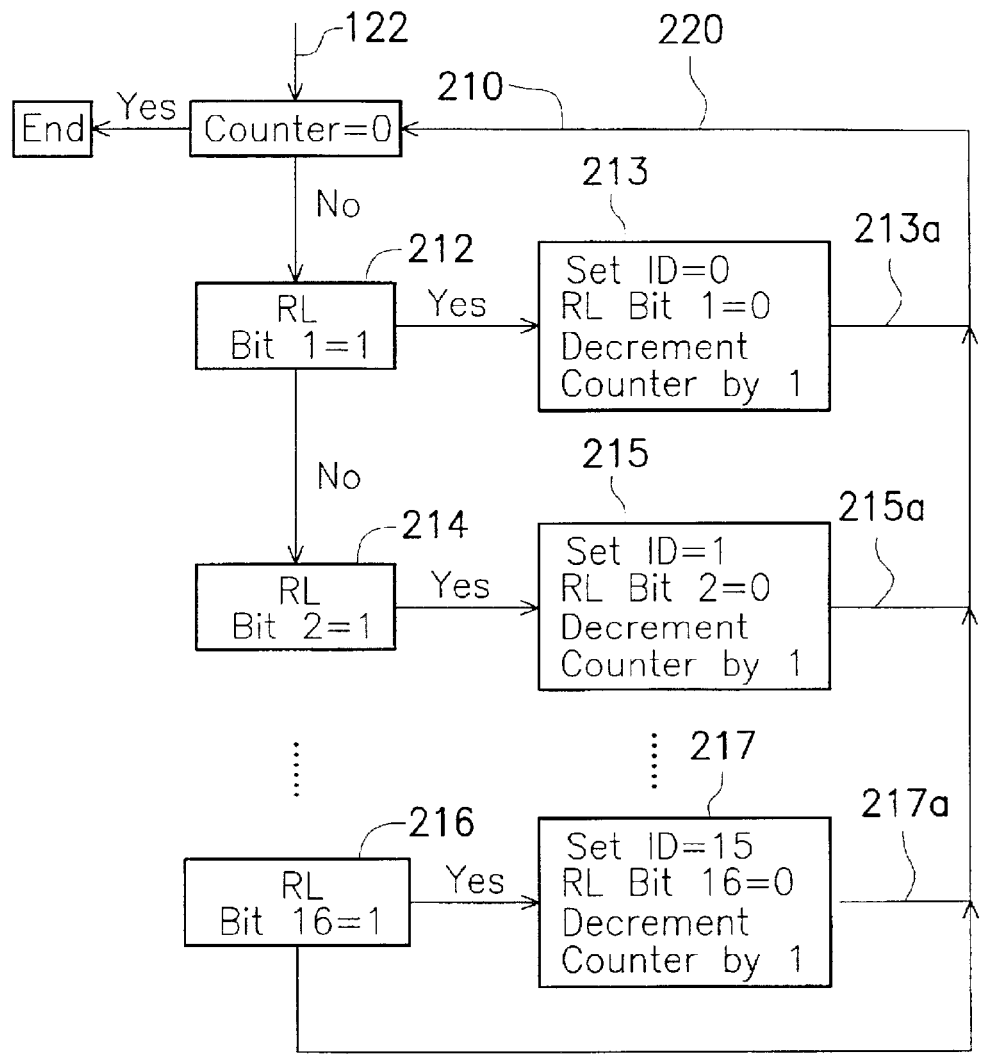
FIG. 2 is a flow chart showing the stages of operation inside the register ID number generator shown in FIG. 1.

FIG. 2 is a flow chart showing the stages of operation inside the register ID number generator 130 shown in FIG. 1. On receiving the count control signal submitted by the counter 120 via the cable 122, the register ID generator first determines if the count value has decrement to zero in step 210. If the count value is zero, the processing is completed. However, if the count value is non-zero, one or more registers remain to be operated on. In step 212, the first bit in the RL decode information is checked for a bit value of '1'. If a bit value of '1' is in that position, this implies that the first register in the register list needs to be accessed. In step 213, identification number of the register is set to facilitate access. In the example, ID=0. Thereafter, the first bit in the register list is set to '0' to avoid repetition. In other words, by setting the first bit in the register list to zero, the next count value will not operate on the first register in the register list again. Lastly, the value in the counter is decrement by one.

Control is returned to the original state via route 220 so that step 210 is repeated. Here, the count value is again queried to determine if zero is reached. If a zero shows up, this implies the instruction is complete. On the other hand, if the count value is still non-zero, step 212 is executed to determine if the first bit in the register list has a value '1'. Since the value in the first bit position is already set to a zero in a previous step 213, the next step 214 is carried out. In step 214, the second bit in the RL decoder information is checked to determine if a value of '1' is there. If a '1' is actually present in the second bit position, the register ID is set to a value one, that is, ID=1. Similarly, in step 215, the second position bit in the register list is set to zero to avoid repetition followed by decreasing the counter value by one. If the second bit position contains a '0' initially, the value in the third bit position of the RL decoder information is investigated to determine if any operation of the third register is required. The aforementioned processes are repeated until the count value in the counter 120 has dropped to zero. In fact, the number of repeated steps should be equal to the initial value count in the counter 120. Hence, with such an architectural system, the initial count value submitted to the counter 120 indicates the number of registers requiring data transfer.

In conclusion, this invention provides an apparatus for executing block data transfer instruction inside a processor.

The apparatus is capable of finding out the registers and their corresponding addresses that must be processed from the decode information of a register list. By processing the data in the specified registers only, program code as well as the processor execution cycles can be reduced. Hence, performance of the processor can be improved considerably.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for executing block data transfer instruction inside a processor after receiving decode information containing N bits, the apparatus comprising:

an adder for receiving the N-bit decode information and adding the N bits together to produce an initial count value;

a counter connecting to the adder for receiving the initial count value, decreasing the value by one after outputting a count control signal;

a register identification number generator that generates a plurality of register identification numbers equal in number to the initial count value according to the count control signal, wherein the register identification number correspond to the bit positions in the N-bit decode information having a bit value '1';

a memory unit for holding data; and a register list that includes a plurality of registers, wherein the register list is able to receive the register identification numbers so that stored data is freely exchangeable between the memory unit and the registers that correspond to the register identification numbers.

2. The apparatus of claim 1, wherein the apparatus further includes an address calculator for generating an address signal according to the decode information and then outputting the address signal to the memory unit so that data is freely exchangeable between the registers that correspond to the register identification numbers and the addressed memory in the memory unit according to the address signal.

3. The apparatus of claim 1, wherein the register identification number generator further includes N logic units for generating register identification numbers equal in number to the initial count value such that when the counter decrements by one down to zero, the N logic unit is able to generate corresponding register identification number according to the bit position in the N-bit decode information that has a value '1'.

4. A method of executing block data transfer instruction inside a processor after receiving an N-bit decode information, comprising the steps of:

adding the N bits together to form an initial count value;

receiving the initial count value and generating a plurality of register identification numbers identical in number to the initial count value, wherein the register identification numbers correspond to the bit positions of the N-bit decode information that has a bit value '1'; and linking up a plurality of registers that correspond to the register identification numbers and a memory unit according to the register identification numbers so that stored data is exchangeable between the memory unit and the registers.

5. The method of claim 4, wherein the step for generating the register identification numbers includes the sub-steps of:

performing a count down operation decreasing the initial value count by one until the value zero is reached; and generating a register identification number whenever a bit value of "1" is found in the N-bit decode information after each count down operation.

6. The method of claim 4, wherein the method further includes generating an address signal according to the decode information so that stored data in the register corresponding to the register identification number and data within the memory unit having an address corresponding to the address signal can exchange with each other.

7. A method of executing block data transfer instruction inside a processor after receiving an N-bit decode information, comprising the steps of:

adding the N bits together to form an initial count value;

outputting the initial count value as a count value;

determining if the count value has decrement to zero; and if the count value is zero, the processing is completed, otherwise if the count value is non-zero, performs following checking steps;

sequentially check the N-bit decode information for a bit value of '1';

if a bit value of '1' is found, an identification number of one of a plurality of register is set to facilitate access;

setting the found bit whose bit value is '1' to '0';

decreasing the count value by one; and repeating the checking steps until the count value is decreased to zero.

* * * * *